(12) United States Patent
Fotiadis et al.

(10) Patent No.: US 10,757,606 B2
(45) Date of Patent: Aug. 25, 2020

(54) GATEWAY, MASTER ACCESS NODE AND METHODS THEREOF

(71) Applicant: Huawei Technologies Co., Ltd., Shenzhen (CN)

(72) Inventors: Panagiotis Fotiadis, Kista (SE); Pablo Soldati, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 16/128,024

(22) Filed: Sep. 11, 2018

(65) Prior Publication Data

US 2019/0014501 A1 Jan. 10, 2019

Related U.S. Application Data

(63) Continuation of application No. PCT/EP2016/062957, filed on Jun. 8, 2016.

(51) Int. Cl.
*H04W 28/08* (2009.01)
*H04W 36/22* (2009.01)
(Continued)

(52) U.S. Cl.
CPC ......... *H04W 28/085* (2013.01); *H04L 1/0026* (2013.01); *H04L 47/41* (2013.01);
(Continued)

(58) Field of Classification Search
CPC ... H04W 28/085; H04W 28/10; H04W 92/20; H04W 72/085; H04W 28/12;
(Continued)

(56) References Cited

U.S. PATENT DOCUMENTS

2013/0176988 A1* 7/2013 Wang .................... H04W 28/08
370/331
2015/0045038 A1* 2/2015 Gao ....................... H04W 36/22
455/438

(Continued)

FOREIGN PATENT DOCUMENTS

CN 103039109 A 4/2013
CN 104349387 A 2/2015
(Continued)

OTHER PUBLICATIONS

"3rd Generation Partnership Project; Technical Specification Group Radio Access Network; Study on Wireless Local Area Network (WLAN)-3GPP radio interworking (Release 12)," 3GPP TR 37.834 V12.0.0, pp. 1-17, 3rd Generation Partnership Project, Valbonne, France (Dec. 2013).

(Continued)

*Primary Examiner* — Kiet Tang
(74) *Attorney, Agent, or Firm* — Leydig, Voit & Mayer, Ltd.

(57) ABSTRACT

A gateway comprises a transceiver configured to receive a sequence of data packets on a Radio Access Bearer, RAB, from a core network, a processor configured to obtain a first distribution of the received sequence of data packets into a first sub-sequence of data packets and at least a second sub-sequence of data packets, wherein the transceiver is configured to forward the first sub-sequence of data packets on the RAB to a master access node, forward the second sub-sequence of data packets on the RAB to a secondary access node. The master access node comprises a processor, a transceiver configured to receive a first sub-sequence of data packets of a sequence of data packets carried by a RAB from a gateway, wherein the RAB is associated with a user (Continued)

device, and to forward at least one part of the first subsequence of data packets on the RAB to the user device.

22 Claims, 6 Drawing Sheets

(51) Int. Cl.

| | | |
|---|---|---|
| H04L 12/707 | (2013.01) | |
| H04W 28/02 | (2009.01) | |
| H04W 88/16 | (2009.01) | |
| H04L 12/891 | (2013.01) | |
| H04W 28/10 | (2009.01) | |
| H04W 76/27 | (2018.01) | |
| H04L 1/00 | (2006.01) | |
| H04W 24/10 | (2009.01) | |
| H04W 28/12 | (2009.01) | |
| H04W 72/08 | (2009.01) | |
| H04W 92/20 | (2009.01) | |
| H04W 92/02 | (2009.01) | |

(52) U.S. Cl.
CPC ....... *H04W 24/10* (2013.01); *H04W 28/0252* (2013.01); *H04W 28/10* (2013.01); *H04W 28/12* (2013.01); *H04W 72/085* (2013.01); *H04W 76/27* (2018.02); *H04W 88/16* (2013.01); *H04W 92/20* (2013.01); *H04L 45/24* (2013.01); *H04W 28/0278* (2013.01); *H04W 92/02* (2013.01)

(58) Field of Classification Search
CPC ..... H04W 24/10; H04W 76/27; H04W 88/16; H04W 28/0252; H04W 92/02; H04W 28/0278; H04L 47/41; H04L 1/0026; H04L 45/24
See application file for complete search history.

(56) References Cited

U.S. PATENT DOCUMENTS

| | | |
|---|---|---|
| 2015/0181473 A1 | 6/2015 | Horn et al. |
| 2016/0157155 A1 | 6/2016 | Chiba et al. |
| 2017/0353380 A1* | 12/2017 | Ergen ............... H04L 45/24 |

FOREIGN PATENT DOCUMENTS

| | | |
|---|---|---|
| WO | 2015019171 A2 | 2/2015 |
| WO | 2015167546 A1 | 11/2015 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.3.0, pp. 1-295, 3rd Generation Partnership Project, Valbonne, France (Mar. 2016).

* cited by examiner

GATEWAY, MASTER ACCESS NODE AND METHODS THEREOF

CROSS-REFERENCE TO RELATED APPLICATIONS

This application is a continuation of International Application No. PCT/EP2016/062957, filed on Jun. 8, 2016, which is incorporated herein by reference in its entirety.

TECHNICAL FIELD

Embodiments of the present invention relate to a gateway and a master access node. Furthermore, the embodiments also relate to corresponding methods, a wireless communication system, a computer program, and a computer program product.

BACKGROUND

Radio access networks are rapidly becoming increasingly denser and heterogeneous as we move towards 5G. In the future, network architectures will support Heterogeneous Network (HetNet) deployments in which an anchor node provides wide area coverage, signalling and possibly data plane connectivity, whilst subtended small cells offer high bandwidth user plane links to user devices. In this context, a user device can maintain at least two data plane radio links having the possibility to be simultaneously receiving data packets from both nodes.

The anchor node is commonly referred to as the Master eNB (MeNB) since it also provides control plane connectivity for the user device via a Radio Resource Control (RRC) radio link. On the contrary, the small cell nodes are referred to as Secondary eNBs (SeNB) solely providing data plane transmissions. Different realizations of this concept are available in the prior art which are thoroughly described in the following section of this disclosure.

For LTE HetNet deployments, 3GPP LTE Release 12 specifies Dual Connectivity (DC) between macro cell MeNBs and small cell SeNBs operating on different frequency bands and being interconnected via non ideal backhaul (i.e. X2 interface). Specifically, LTE DC is supported by two different network architectures, namely the 3C and 1A architecture.

In the 3C DC architecture a Serving Gateway (S-GW) routes all data packets of a user device Radio Access Bearer (RAB) to the MeNB over the S1 interface. Thereafter, the MeNB is responsible for determining a split of the data packets between the traffic ratio to be sent to the user device via the MeNB and the SeNB, respectively. The packet-level RAB splitting decision takes place at the Packet Data Convergence Protocol (PDCP) layer of the MeNB and PDCP packets are forwarded to the SeNB over the X2 interface. The SeNB queues the received packets and determines when to schedule their transmission to the user device. The weakness of the existing solution is that packet transmissions from the SeNB incur delays of tenths of milliseconds due to the packet forwarding over the X2 interface, a fact that naturally increases the latency of the data plane.

Unlike 3C DC, the 1A DC architecture solely supports RAB splitting at a RAB granularity performed by the S-GW. The S-GW routes each RAB of the user device either to the MeNB or to the SeNB. No packet forwarding from the MeNB towards the SeNB takes place over the X2 interface, and packets belonging to the same RAB are transmitted to the user device only by a single eNB (either the MeNB or SeNB depending on the splitting decision at the S-GW). The 1A architecture is suitable for steering RABs based on their traffic type. For instance, a RAB with strict Quality of Service (QoS) requirements could be routed to the MeNB while best-effort data traffic RAB could be routed to the SeNB. However, the technical problem of this solution is that it limits the aggregated bandwidth allocated to packet transmissions belonging to the same RAB since the user device is only scheduled by a single network node.

In an additional related conventional solution, the LTE SeNB is further co-located with a Wireless Local Area Network (WLAN) access point or Licensed Assisted Access (LAA). The control plane RRC connection is still anchored to the LTE MeNB and the user device can have up to three data plane connections (one with the MeNB and two with the SeNB). Specifically, the architecture reuses the 3C split-bearer concept meaning that the MeNB receives the RAB packet flow from the S-GW; determining a ratio of the packet flow to be forwarded to the SeNB over the X2 interface. Thereby, this conventional solution inherits the drawback of the 3C DC architecture, which is the data plane latency increase owing to the mandatory packet forwarding over the X2 interface.

SUMMARY

An objective of embodiments of the invention is to provide a solution which mitigates or solves the drawbacks and problems of conventional solutions.

The above and further objectives are achieved by the subject matter of the independent claims. Further advantageous implementation forms of the invention are defined by the dependent claims.

According to a first aspect of the invention, the above mentioned and other objectives are achieved with a gateway for a communication system, the gateway comprising a transceiver configured to receive a sequence of data packets on a Radio Access Bearer, RAB, from a core network, a processor configured to obtain a first distribution of the received sequence of data packets into a first sub-sequence of data packets and at least a second sub-sequence of data packets, wherein the transceiver is configured to forward the first sub-sequence of data packets on the RAB to a master access node, forward the second sub-sequence of data packets on the RAB to a secondary access node.

It is to be understood that the first distribution of the received sequence of data packets may represent a fraction or a percentage of the data packets that the gateway should use to form a first sub-sequence of data packets and at least a second sub-sequence of data packets. In one alternative implementation, the first distribution may represent the sequence number of the data packets to be used to form the first sub-sequence of data packets and the at least second sub-sequence of data packets. It is also to be understood that obtaining a first distribution may either require the gateway to determine said distribution or to receive said distribution from another network node, e.g. the master access node.

A number of advantages are provided by the gateway according to the first aspect. One such advantage is that the present gateway enables packet-level RAB splitting at the gateway enabling a more flexible management of the network traffic. Furthermore, the user device has access to a larger transmission bandwidth since different data packets belonging to the same RAB are concurrently scheduled from two access nodes which essentially increases the perceived data rate of the user device. Another advantage is reduced latency of the data plane since a sub-sequence of the data packets addressed to the user device is directly forwarded from the gateway to the secondary access node avoiding excessive data packet forwarding from the master access to the secondary access node. The latter is valid if there is non-ideal backhaul interface between the master access node and secondary access node.

In a first possible implementation form of a gateway according to the first aspect, the transceiver is configured to receive at least one flow control message associated with the RAB, wherein the processor is configured to obtain the first distribution by determining the first distribution based on at least the received at least one flow control message.

An advantage of the first possible implementation form is that it enables coordination between the gateway and the access nodes, i.e. the master access node and the secondary access nodes. In such manner, the gateway is assisted on determining the first distribution based on the information contained in the flow control messages. Thereafter, the gateway can use this information to determine the first distribution of the received sequence of data packets depending on the configured optimization strategy of the gateway. For instance, the first distribution could be determined such that it maximizes the access node or user device throughput, minimizes the data plane latency or balances the load between the master access node and the secondary access node.

In a second possible implementation form of a gateway according to the first implementation form of the first aspect, the transceiver is configured to receive a first flow control message from the master access node, wherein the first flow control message comprises a Radio Resource Control, RRC, measurement report associated with the RAB and at least one of: an indication of traffic load at the master access node, an indication of interference level for the RAB, an indication of radio resources available at the master access node, an indication of expected packet delivery rate for the RAB, an indication of the buffer status associated to the RAB, and an indication of expected quality of service or quality of experience for the RAB;

wherein the processor is configured to determine the first distribution based on the received first flow control message.

An advantage of the second possible implementation form is that the gateway can determine a efficient first distribution of the received sequence of data packets based on the information contained in the first flow control message. For instance, if the traffic load at the master access node is high and the user device experiences good radio channel quality at the secondary access node (this information could be contained within the RRC measurement report) the gateway could determine the first distribution such that most of the data packets are forwarded to the secondary access node.

In a third possible implementation form of a gateway according to the first or second implementation form of the first aspect, the first flow control message comprises a second distribution of the first sub-sequence of data packets into a third sub-sequence of data packets and at least a fourth sub-sequence of data packets, and further indicating that the fourth sub-sequence is addressed for the secondary access node.

An advantage of the third possible implementation form is that the gateway is informed about the portion of data packets that the master access node forwards to the secondary access node, and therefore can adjust the first distribution accordingly. For instance, if the gateway currently forwards a large number of data packets to the master access node and the newly received first flow control message indicates that most of the data packets are thereafter forwarded to the secondary access node, the gateway can modify the first distribution such that the ratio of data packets forwarded directly to the secondary access node increases. Furthermore, unwanted situations where the gateway overestimates the secondary access node capacity and overflows its buffer by sending too many data packets could be avoided.

In a fourth possible implementation form of a gateway according to the first, second or third implementation form of the first aspect, the transceiver is configured to receive a second flow control message associated with the RAB from the secondary access node, wherein the second flow control message comprises at least one of: an indication of traffic load at the secondary access node, an indication of interference level for the RAB, an indication of radio resources available at the secondary access node, an indication of expected packet delivery rate for the RAB, an indication of the buffer status associated to the RAB, and an indication of expected quality of service or quality of experience for the RAB;

wherein the processor is configured to determine the first distribution based on the received second flow control message.

In an example the first flow control message comprises fully or partially the second flow control message. For example, the second flow control message could be encapsulated in the first flow control message.

An advantage of the fourth possible implementation form is that the gateway further becomes aware of the traffic load at the secondary access node as well as the RAB status (such as interference, resource availability, expected packet delivery, etc.) at the secondary access node This information can be used by the gateway for determining an improved first distribution, for instance by comparing the RAB status at the master access node and the secondary access node.

In a fifth possible implementation form of a gateway according to the second, third or fourth implementation form of the first aspect, the transceiver is configured to transmit a control message comprising the first distribution to the master access node.

An advantage of the fifth possible implementation form is that the master access node is informed about the portion of data packets that the gateway directly forwards to the secondary access node. This information can be used by the master access node for determining an improved second distribution of the received first sub-sequence of data packets. Furthermore, unwanted situations where the master access node overestimates the secondary access node capacity and overflows its buffer by sending too many data packets could be avoided.

In a sixth possible implementation form of a gateway according to any of the preceding implementation forms of the first aspect or to the first aspect as such, the transceiver is configured to receive a distribute packet command indicating the first distribution from the master access node;

wherein the processor is configured to obtain the first distribution based on the received distribute packet command.

An advantage of the sixth possible implementation form is that it limits significantly the amount of control information required for enabling the gateway to obtain the first distribution. This is because the first distribution is determined by the master access node which thereafter simply signals it to the gateway with the distribute packet command. Moreover, the master access node is closer to the radio access network and therefore can better adapt to the varying network conditions. Hence, the master access node may determine an improved first distribution.

In a seventh possible implementation form of a gateway according to any of the preceding implementation forms of the first aspect or to the first aspect as such, the first distribution comprises a split of the received sequence of data packets into the first sub-sequence of data packets and the second sub-sequence of data packets.

An advantage of the seventh possible implementation form that it introduces packet-level RAB splitting at the gateway enabling a more flexible management of the network traffic. Furthermore, the user device has access to a larger transmission bandwidth since different packets belonging to the same RAB are scheduled from two access nodes which essentially increases the user device perceived data rate. Another advantage is reduced latency of the data plane since a sub-sequence of the data packets addressed to the user device is directly forwarded from the gateway to the secondary access node avoiding excessive data packet forwarding from the master access to the secondary access node.

According to a second aspect of the invention, the above mentioned and other objectives are achieved with master access node for a communication system, the master access node comprising
 a processor,
 a transceiver configured to
 receive a first sub-sequence of data packets of a sequence of data packets carried by a RAB from a gateway, wherein the RAB is associated with a user device,
 forward at least one part of the first sub-sequence of data packets on the RAB to the user device.

As the master access node do not receive the whole sequence of data packets carried on the RAB from the gateway to the user device, the need of forwarding a portion of the received data packets to the secondary access node is reduced significantly. Thereby, an advantage of the master access node according to the second aspect is that it decreases the data plane latency by avoiding excessive data packet forwarding from the master access node to the secondary access node.

In a first possible implementation form of a master access node according to the second aspect, the transceiver is configured to
 receive a RRC measurement report from the user device, the RRC measurement report being associated to the master access node or at least one secondary access node,
 determine at least one of: an indication of traffic load at the master access node associated with the RAB, an indication of interference level for the RAB, an indication of radio resources available at the master access node for the RAB, an indication of expected packet delivery rate for the RAB, an indication of the buffer status associated to the RAB, and an indication of expected quality of service or quality of experience for the RAB based on the received RRC measurement report.

An advantage of the first possible implementation form is that the master access node determines information which can be later used by the gateway for obtaining the first distribution of the sequence of data packets received from the core network. If the master access node is further interconnected with the secondary access node, this information could be further used for enabling the master access node to determine the second distribution.

In a second possible implementation form of a master access node according to the first implementation form of the second aspect, the transceiver is configured to
 transmit a first flow control message to the gateway, the first flow control message comprising the RRC measurement report and at least one of: an indication of traffic load at the master access node associated with the RAB, an indication of interference level for the RAB, an indication of radio resources available at the master access node for the RAB, an indication of expected packet delivery rate for the RAB, an indication of the buffer status associated to the RAB, and an indication of expected quality of service or quality of experience for the RAB.

An advantage of the second possible implementation form is that via the first flow control message the gateway becomes aware of the RAB status and the traffic load at the master access node. This information may be used by the gateway for determining the first distribution of the sequence of data packets received from the core network.

In a third possible implementation form of a master access node according to the first or second implementation form of the second aspect, the transceiver is configured to
 receive a second flow control message from the secondary access node, the second flow control message comprising at least one of: an indication of traffic load at the secondary access node, an indication of interference level for the RAB, an indication of radio resources available at the secondary access node, an indication of expected packet delivery rate for the RAB, an indication of the buffer status associated to the RAB, and an indication of expected quality of service or quality of experience for the RAB,
 encapsulate into the first flow control message at least one of; an indication of traffic load at the secondary access node, an indication of interference level for the RAB, an indication of radio resources available at the secondary access node, an indication of expected packet delivery rate for the RAB, an indication of the buffer status associated to the RAB, and an indication of expected quality of service or quality of experience for the RAB,
 transmit the first flow control message to the gateway.

An advantage of the third possible implementation form is that it reduces the control signalling induced by the transmission of the flow control messages. This is because the secondary access node no longer needs to periodically transmit the second flow control to the gateway.

In a fourth possible implementation form of a master access node according to the first, second or third implementation form of the second aspect, the processor is configured to
 determine a first distribution of the sequence of data packets into the first sub-sequence of data packets and at least a second sub-sequence of data packets based on at least one of the RRC measurement report and second flow control message, wherein the first sub-sequence of data packets is addressed for the master access node and the second sub-sequence of data packets is addressed for the secondary access node,
 wherein the transceiver is configured to
 transmit a distribute packet command indicating the first distribution to the gateway.

An advantage of the fourth possible implementation form is that it limits significantly the amount of control information required for enabling the gateway to obtain the first distribution. This is because the first distribution is determined by the master access node which thereafter signals the first distribution to the gateway with the distribute packet command. Furthermore, the master access node is closer to the radio access network and therefore can better adapt to the changing network conditions. Thus, the master access node may determine an improved first distribution.

In a fifth possible implementation form of a master access node according to the first implementation form of the second aspect, wherein the processor is configured to determine the first distribution further based on the RRC measurement report and at least one in the group of: the traffic load at the master access node, an indication of interference level for the RAB, an indication of radio resources available at the master access node, an indication of expected packet delivery rate for the RAB at the master access node, an indication of the buffer status associated to the RAB at the master access node, wherein the transceiver is configured to transmit a distribute packet command indicating the first distribution to the gateway.

An advantage of the fifth implementation form is that it enables the gateway to obtain the first distribution when the second flow control is not available. Thus, the control signalling can be further reduced since there is no need for flow control messages from the secondary access node.

In a sixth possible implementation form of a master access node according to the fourth implementation form of the second aspect, the processor is configured to determine the first distribution further based on the traffic load at the master access node or at the secondary access node, an indication of interference level for the RAB, an indication of radio resources available at the master access node or at the secondary access node, an indication of expected packet delivery rate for the RAB at the master access node or at the secondary access node, an indication of the buffer status associated to the RAB at the master access node or at the secondary access node.

An advantage of the sixth possible implementation form is that the master access node may determine an improved first distribution as it can compare the RAB status at the master access node and the secondary access node. Moreover, it reduces the control signalling introduced by the flow control messages.

In a seventh possible implementation form of a master access node according to any of the first to the sixth implementation forms of the second aspect, the processor is configured to determine a second distribution of the first sub-sequence of data packets into a third sub-sequence of data packets and at least a fourth sub-sequence of data packets based on at least one of the RRC measurement report and second flow control message, wherein the transceiver is configured to forward the third sub-sequence of data packets to the user device, forward the fourth sub-sequence of data packets to a secondary access node.

An advantage of the seventh possible implementation form is that it enables a multi-node RAB splitting network architecture since apart from the first distribution of the data packets determined at the gateway, a second distribution is determined at the master access node for forwarding a portion of the first sub-sequence of data packets to the secondary access node. This results in a flexible traffic management where the first distribution at the gateway could e.g. aim at reducing the user plane latency whilst the second distribution at the master access node could aim at maximizing the user device perceived data rate. Other aims for the first and second distributions are possible.

In an eight possible implementation form of a master access node according to the seventh implementation form of the second aspect, the transceiver is configured to receive a control message from the gateway, the control message indicating a first distribution of the sequence of data packets into the first sub-sequence of data packets and at least a second sub-sequence of data packets, wherein the processor is configured to determine the second distribution based on at least one of the RRC measurement report, second flow control message and the received control message.

An advantage of the eighth possible implementation form is that it enables the master access node to determine an improved second distribution of the first subsequence of data packets. As the master access node is further aware of the portion of data packets that are directly forwarded from the gateway to the secondary access node. In such a manner, unwanted situations where the master access may overestimate the secondary access node capacity and overflow its buffer by sending too many data packets could be avoided.

In a ninth possible implementation form of a master access node according to the seventh or eighth implementation form of the second aspect, the second distribution comprises a split of the first sub-sequence of data packets into the third sub-sequence of data packets and the fourth sub-sequence of data packets.

An advantage of the ninth possible implementation form is that it enables a multi-node RAB splitting network architecture since apart from the first distribution of the data packets determined at the gateway, a second RAB splitting decision is defined at the master access node for forwarding a portion of the first sub-sequence of data packets to the secondary access node. This results in a flexible traffic management where the first split at the gateway could e.g. aim at reducing the user plane latency whilst the second split at the master access node could aim at maximizing the user device perceived data rate. Other aims for the first and second splits are possible.

In a tenth possible implementation form of a master access node according to any of the seventh to ninth implementation form of the second aspect when dependent on the second implementation form of the second aspect, the first flow control message further comprises an indication of the second distribution.

An advantage of the tenth possible implementation form is that the gateway is informed about the portion of data packets that the master access node forwards to the secondary access node. Therefore, the gateway can adjust the first distribution accordingly. For instance, if the gateway currently forwards a large number of data packets to the master access node and the latest first flow control message indicates that most of them are thereafter to be forwarded to the secondary access node, the gateway can modify the first distribution such that the ratio of data packets forwarded directly to the secondary access node increases.

According to a third aspect of the invention, the above mentioned and other objectives are achieved with receiving a sequence of data packets on a Radio Access Bearer, RAB, from a core network, obtaining a first distribution of the received sequence of data packets into a first sub-sequence of data packets and at least a second sub-sequence of data packets, forwarding the first sub-sequence of data packets on the RAB to a master access node, forwarding the second sub-sequence of data packets on the RAB to a secondary access node.

In a first possible implementation form of a method according to the third aspect, the method comprises receiving at least one flow control message associated with the RAB, obtaining the first distribution by determining the first distribution based on at least the received at least one flow control message.

In a second possible implementation form of a method according to the first implementation form of the third aspect, the method comprises receiving a first flow control message from the master access node, wherein the first flow control message comprises a Radio Resource Control, RRC, measurement report associated with the RAB and at least one of: an indication of traffic load at the master access node, an indication of interference level for the RAB, an indication of radio resources available at the master access node, an indication of expected packet delivery rate for the RAB, an indication of the buffer status associated to the RAB, and an indication of expected quality of service or quality of experience for the RAB;

determining the first distribution based on the received first flow control message.

In a third possible implementation form of a method according to the first or second implementation form of the third aspect, the first flow control message comprises a second distribution of the first sub-sequence of data packets into a third sub-sequence of data packets and at least a fourth sub-sequence of data packets, and further indicating that the fourth sub-sequence is addressed for the secondary access node.

In a fourth possible implementation form of a method according to the first, second or third implementation form of the third aspect, the method comprises receiving a second flow control message associated with the RAB from the secondary access node, wherein the second flow control message comprises at least one of: an indication of traffic load at the secondary access node, an indication of interference level for the RAB, an indication of radio resources available at the secondary access node, an indication of expected packet delivery rate for the RAB, an indication of the buffer status associated to the RAB, and an indication of expected quality of service or quality of experience for the RAB;

determining the first distribution based on the received second flow control message.

In a fifth possible implementation form of a method according to the second, third or fourth implementation form of the third aspect, the method comprises transmitting a control message comprising the first distribution to the master access node.

In a sixth possible implementation form of a method according to any of the preceding implementation forms of the third aspect or to the third aspect as such, the method comprises receiving a distribute packet command indicating the first distribution from the master access node;

obtaining the first distribution based on the received distribute packet command.

In a seventh possible implementation form of a method according to any of the preceding implementation forms of the third aspect or to the third aspect as such, the first distribution comprises a split of the received sequence of data packets into the first sub-sequence of data packets and the second sub-sequence of data packets.

According to a fourth aspect of the invention, the above mentioned and other objectives are achieved with receiving a first sub-sequence of data packets of a sequence of data packets carried by a RAB from a gateway, wherein the RAB is associated with a user device, forwarding at least one part of the first sub-sequence of data packets on the RAB to the user device.

In a first possible implementation form of a method according to the fourth aspect, the method comprises receiving a RRC measurement report from the user device, the RRC measurement report being associated to the master access node or at least one secondary access node, determining at least one of: an indication of traffic load at the master access node associated with the RAB, an indication of interference level for the RAB, an indication of radio resources available at the master access node for the RAB, an indication of expected packet delivery rate for the RAB, an indication of the buffer status associated to the RAB, and an indication of expected quality of service or quality of experience for the RAB based on the received RRC measurement report.

In a second possible implementation form of a method according to the first implementation form of the fourth aspect, the method comprises transmitting a first flow control message to the gateway, the first flow control message comprising the RRC measurement report and at least one of: an indication of traffic load at the master access node associated with the RAB, an indication of interference level for the RAB, an indication of radio resources available at the master access node for the RAB, an indication of expected packet delivery rate for the RAB, an indication of the buffer status associated to the RAB, and an indication of expected quality of service or quality of experience for the RAB.

In a third possible implementation form of a method according to the first or second implementation form of the fourth aspect, the method comprises receiving a second flow control message from the secondary access node, the second flow control message comprising at least one of: an indication of traffic load at the secondary access node, an indication of interference level for the RAB, an indication of radio resources available at the secondary access node, an indication of expected packet delivery rate for the RAB, an indication of the buffer status associated to the RAB, and an indication of expected quality of service or quality of experience for the RAB, encapsulating into the first flow control message at least one of; an indication of traffic load at the secondary access node, an indication of interference level for the RAB, an indication of radio resources available at the secondary access node, an indication of expected packet delivery rate for the RAB, an indication of the buffer status associated to the RAB, and an indication of expected quality of service or quality of experience for the RAB, transmitting the first flow control message to the gateway.

In a fourth possible implementation form of a method according to the first, second or third implementation form of the fourth aspect, the method comprises determining a first distribution of the sequence of data packets into the first sub-sequence of data packets and at least a second sub-sequence of data packets based on at least one of the RRC measurement report and second flow control message, wherein the first sub-sequence of data packets is addressed for the master access node and the second sub-sequence of data packets is addressed for the secondary access node, transmitting a distribute packet command indicating the first distribution to the gateway.

In a fifth possible implementation form of a method according to the first implementation form of the fourth aspect, the method comprises determining the first distribution further based on the RRC measurement report and at least one in the group of: the traffic load at the master access node, an indication of interference level for the RAB, an indication of radio resources available at the master access node, an indication of expected packet delivery rate for the RAB at the master access node, an indication of the buffer status associated to the RAB at the master access node, transmitting a distribute packet command indicating the first distribution to the gateway.

In a sixth possible implementation form of a method according to the fourth implementation form of the fourth aspect, the method comprises determining the first distribution further based on the traffic load at the master access node or at the secondary access node, an indication of interference level for the RAB, an indication of radio resources available at the master access node or at the secondary access node, an indication of expected packet delivery rate for the RAB at the master access node or at the secondary access node, an indication of the buffer status associated to the RAB at the master access node or at the secondary access node.

In a seventh possible implementation form of a method according to any of the first to the sixth implementation forms of the fourth aspect, the method comprises determining a second distribution of the first sub-sequence of data packets into a third sub-sequence of data packets and at least a fourth sub-sequence of data packets based on at least one of the RRC measurement report and second flow control message, forwarding the third sub-sequence of data packets to the user device, forwarding the fourth sub-sequence of data packets to a secondary access node.

In an eight possible implementation form of a method according to the seventh implementation form of the fourth aspect, the method comprises receiving a control message from the gateway, the control message indicating a first distribution of the sequence of data packets into the first sub-sequence of data packets and at least a second sub-sequence of data packets, determining the second distribution based on at least one of the RRC measurement report, second flow control message and the received control message.

In a ninth possible implementation form of a method according to the seventh or eighth implementation form of the fourth aspect, the second distribution comprises a split of the first sub-sequence of data packets into the third sub-sequence of data packets and the fourth sub-sequence of data packets.

In a tenth possible implementation form of a method according to any of the seventh to ninth implementation form of the second aspect when dependent on the second implementation form of the fourth aspect, the first flow control message further comprises an indication of the second distribution.

The advantages of the method according to the third and the fourth aspects are the same as for the corresponding gateway and master access node according to the first aspect and second aspect, respectively.

Embodiments of the invention also relates to a computer program, characterized in code means, which when run by processing means causes said processing means to execute any method according to the invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments will be apparent from the following detailed description.

BRIEF DESCRIPTION OF DRAWINGS

The appended drawings are intended to clarify and explain different embodiments of the invention, in which.

DETAILED DESCRIPTION

Figure 1:
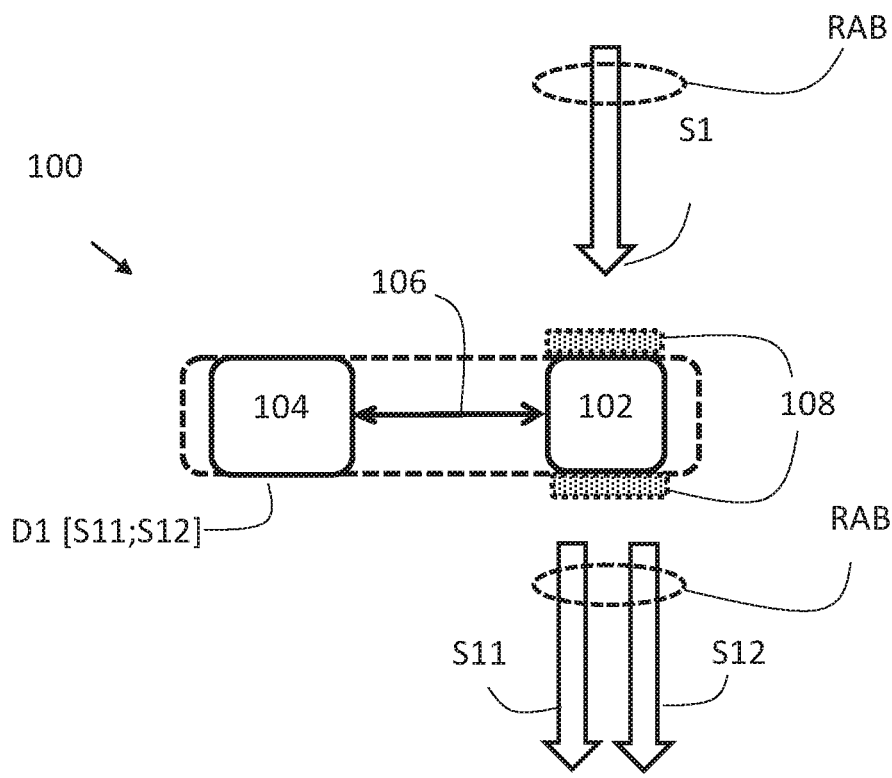
FIG. 1 shows a gateway according to an embodiment of the invention.

FIG. 1 shows a gateway 100 according to an embodiment. The gateway 100 comprises a transceiver 102 configured for transmission and reception in communication systems. The gateway 100 may represent, for instance, the Packet Data Network GateWay or the Serving GateWay of the Long Term Evolution (LTE) system. The transceiver 102 is communicably coupled with a processor 104 of the gateway 100 by means of communication means 106. FIG. 1 also illustrates optional modems 108 coupled with the transceiver 102.

According to the present embodiment, the transceiver 102 is configured to receive a sequence of data packets S1 on a Radio Access Bearer (RAB) from a core network 802 of a wireless communication system (see FIGS. 5 to 8). The processor 104 is configured to split a first distribution D1 of the received sequence of data packets S1 into a first sub-sequence of data packets S11 and at least a second sub-sequence of data packets S12. The transceiver 102 is configured to forward the first sub-sequence of data packets S11 on the RAB to a Master Access Node (MAN) 300 (see FIGS. 5 to 8). The transceiver 102 is configured to forward the second sub-sequence of data packets S12 on the RAB to a Secondary Access Node (SAN) 500 (see FIGS. 5 to 8).

Figure 2:
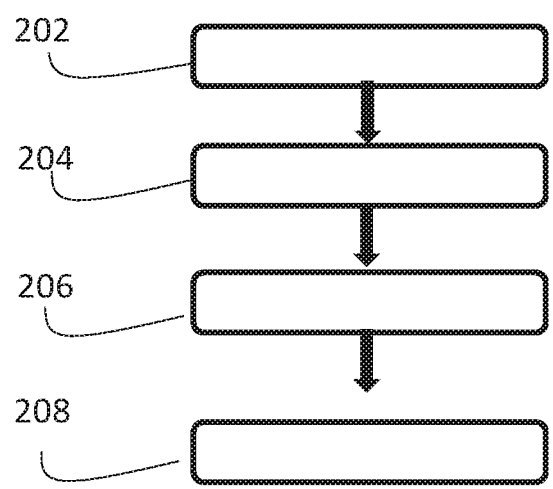
FIG. 2 shows a corresponding method according to an embodiment of the invention.

FIG. 2 shows a flowchart of a corresponding method 200 which may be executed in a gateway 100, such as the one shown in FIG. 1. The method 200 comprises receiving 202 a sequence of data packets S1 on a RAB from a core network 802. The method 200 further comprises splitting 204 a first distribution D1 of the received sequence of data packets S1 into a first sub-sequence of data packets S11 and at least a second sub-sequence of data packets S12. The method 200 further comprises forwarding 206 the first sub-sequence of data packets S11 on the RAB to a MAN 300. The method 200 further comprises forwarding 208 the second sub-sequence of data packets S12 on the RAB to a SAN 500.

In an embodiment, the first distribution D1 comprises a split of the received sequence of data packets S1 into the first sub-sequence of data packets D11 and the second sub-sequence of data packets S12. It is to be understood that the first distribution D1 of the received sequence of data packets S1 may, in one example, indicate a fraction or a percentage of the data packets that the gateway 100 should to be used to form a first sub-sequence of data packets S11 and at least a second sub-sequence of data packets S12. In an alternative, the first distribution D1 may represent the sequence number of the data packets to be used to form the first sub-sequence of data packets S11 and at least a second sub-sequence of data packets S12.

Figure 3:
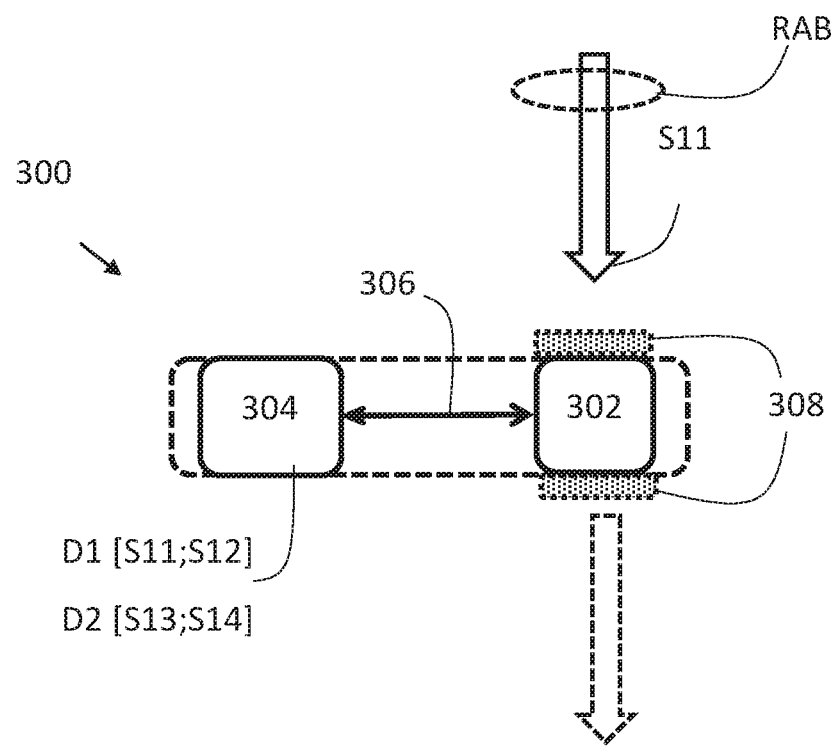
FIG. 3 shows a master access node according to an embodiment of the invention.

FIG. 3 shows a master access node MAN 300 according to an embodiment of the invention. The MAN 300 may represent a base station of a radio communication system, such as an Evolved NodeB (eNodeB) of an LTE system, a master eNodeB in an LTE system, a radio network control node, etc. The MAN 300 comprises a transceiver 302 configured for transmission and reception in communication systems. The transceiver 302 is communicably coupled with a processor 304 of the MAN by means of communication means 306. FIG. 3 also illustrates optional modems 308 coupled with the transceiver 302.

According to the present embodiment, the present MAN 300 is configured to receive a first sub-sequence of data packets S11 of a sequence of data packets S1 carried by a RAB from a gateway 100. The RAB is associated with a user device 700 not shown in FIG. 3. The MAN 300 is further configured to forward at least one part of the first sub-sequence of data packets S11 on the RAB to the user device 700. This is illustrated with the dashed arrow in FIG. 3.

Figure 4:
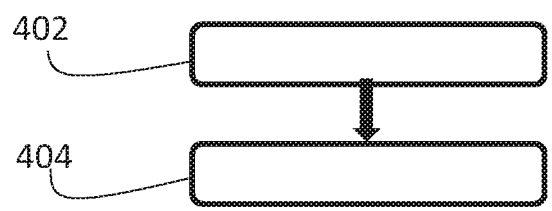
FIG. 4 shows a corresponding method according to an embodiment of the invention.

FIG. 4 shows a flowchart of a corresponding method 400 which may be executed in a MAN 300, such as the one shown in FIG. 3. The method 400 comprises receiving 402 a first sub-sequence of data packets S11 of a sequence of data packets S1 carried by a RAB from a gateway 100. The RAB is associated with a user device 700. The method 200 further comprises forwarding 404 at least one part of the first sub-sequence of data packets S11 on the RAB to the user device 700.

The first distribution D1 may be obtained by the gateway 100 in a number of different ways, which are explained in the following disclosure. For example, obtaining the first distribution D1 may either require the gateway 100 to determine said first distribution D1 or to receive said first distribution D1 from the master access node 300.

Figure 5:
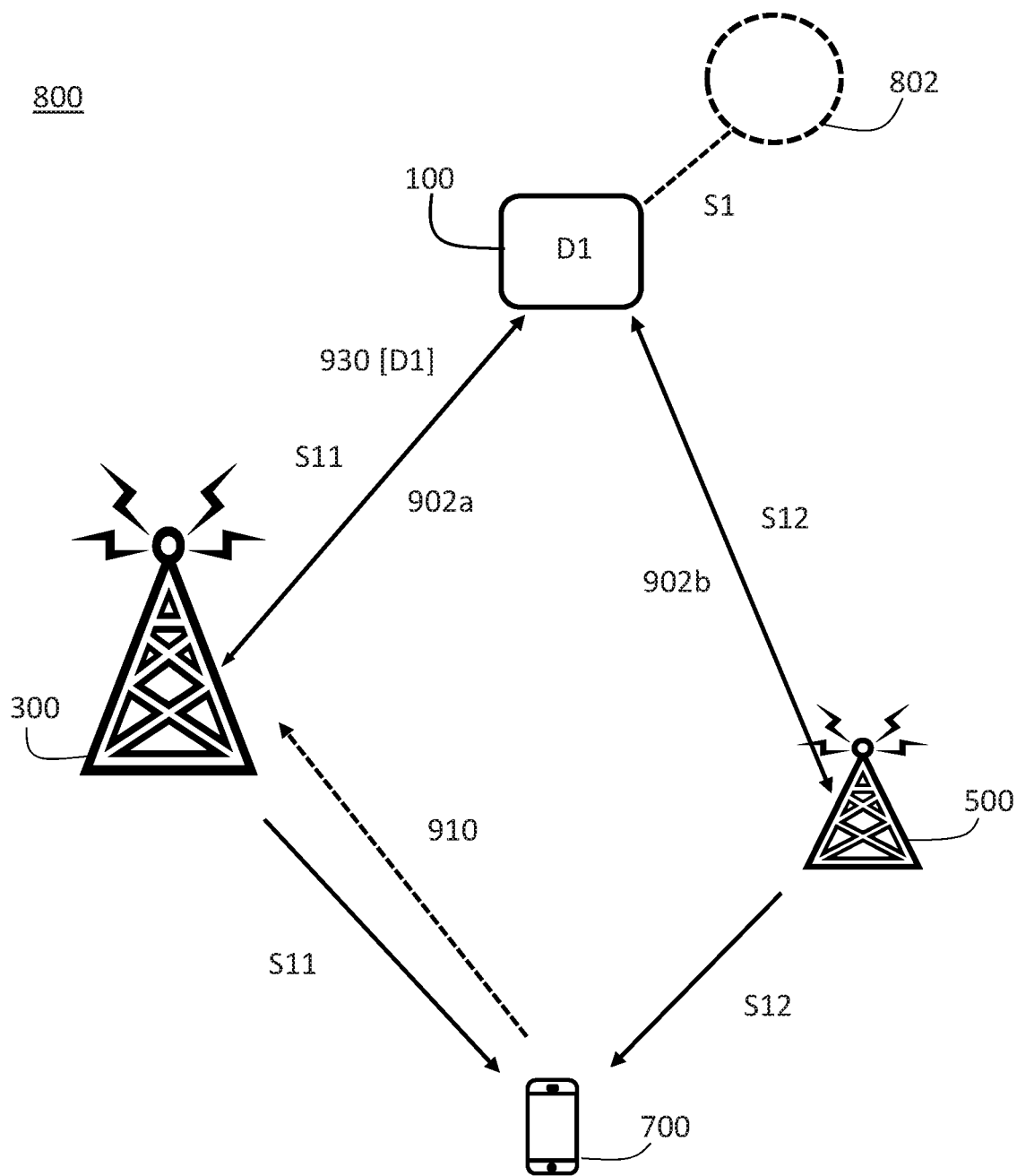
FIGS. 5 to 8 illustrate further embodiments of the invention.
Figure 6:
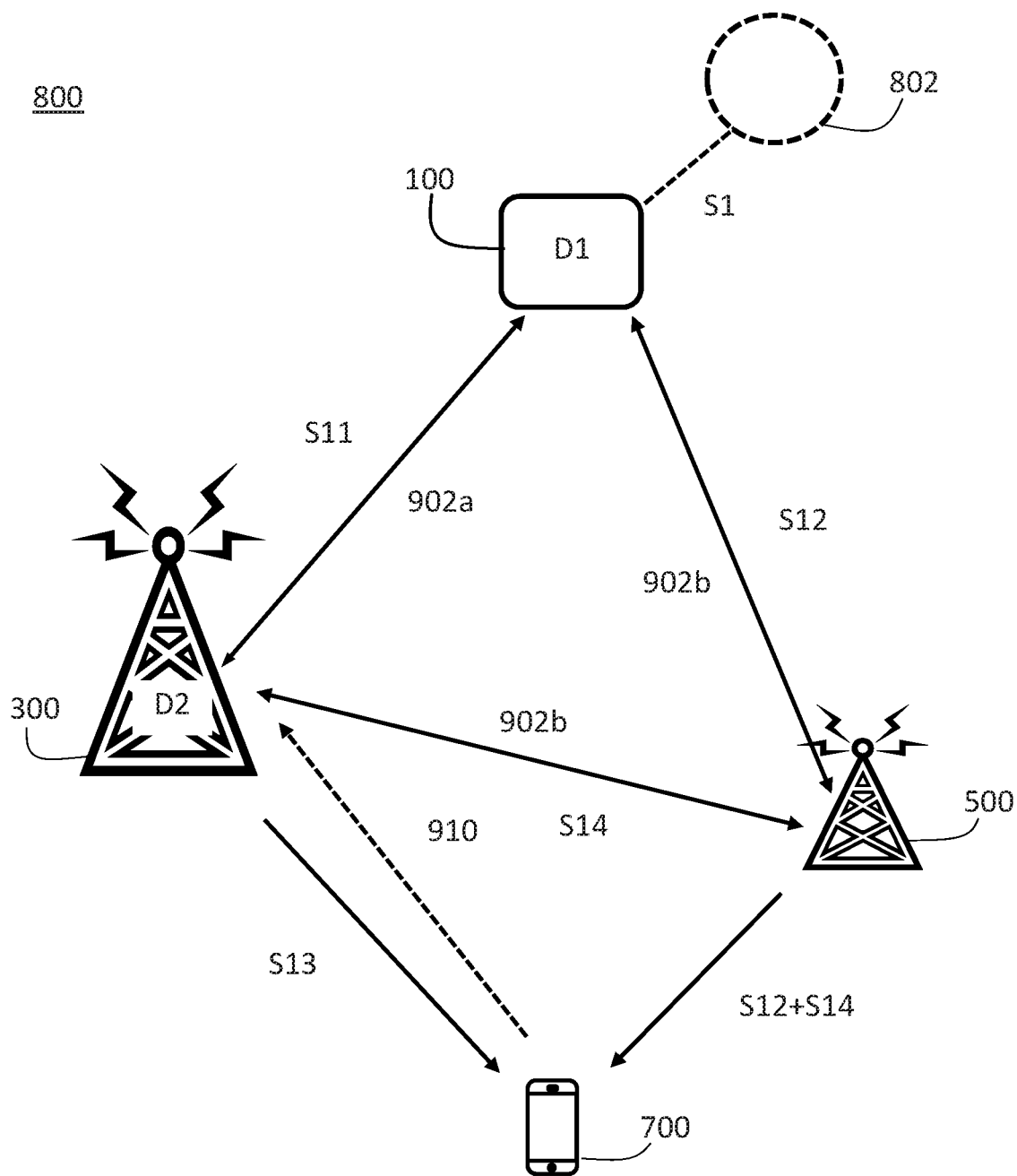
Figure 7:
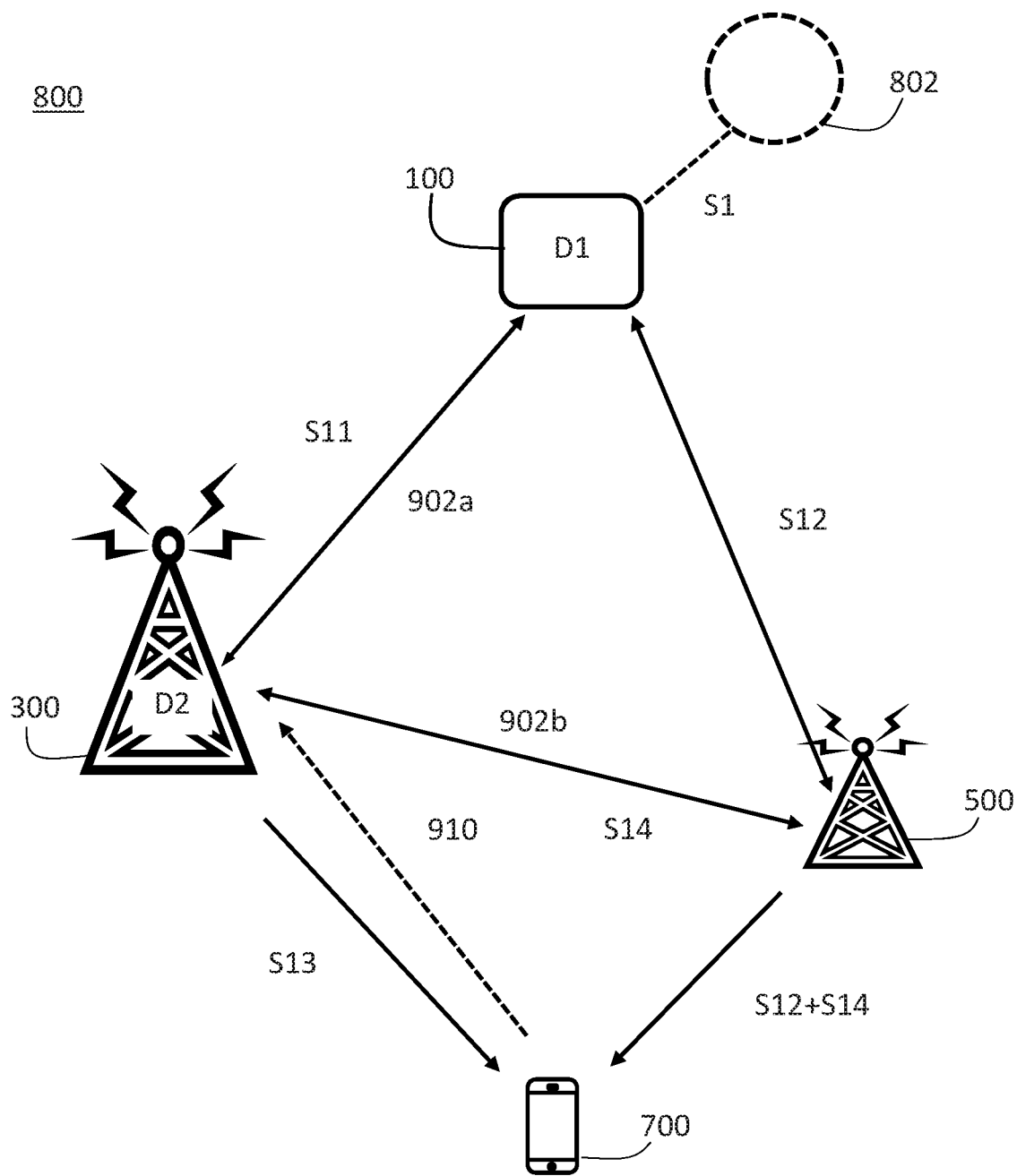

In an embodiment, the gateway 100 is configured to receive at least one flow control message 902a, 902b, . . . , 902n associated with the RAB which is illustrated in FIGS. 5 to 7. Further, the gateway 100 is configured to obtain the first distribution D1 by determining the first distribution D1 based on at least the received at least one flow control message 902a, 902b, . . . , 902n. Hence, the first distribution D1 is in this case determined by the gateway 100 itself.

The at least one flow control message 902a, 902b, . . . , 902n can be received from the MAN 300 or SAN 500 or from both MAN 300 and SAN 500 which is explained more herein.

Regarding the at least one flow control message 902a, 902b, . . . , 902n, in one embodiment the gateway 100 receives a first flow control message 902a, as an example of the at least one flow control message 902a, 902b, . . . , 902n, from the MAN 300. In a LTE system, for example, the first flow control message 902a can be received at the gateway 100 via the General Packet Radio Service (GPRS) Tunneling Protocol (GTP) for control data, also referred to as GTP-C. The first flow control message 902a comprises a Radio Resource Control (RRC) measurement report 910 associated with the RAB and at least one of: an indication of traffic load at the MAN 300, an indication of interference level for the RAB, an indication of radio resources available at the MAN 300, an indication of expected packet delivery rate for the RAB, an indication of the buffer status associated to the RAB, and an indication of expected Quality of Service (QoS) or Quality of Experience (QoE) for the RAB. Based on the first flow control message 902a, the gateway 100 determines the first distribution D1. For example, the gateway 100 could reduce the fraction of data packets forwarded to the MAN 300 when the traffic load at the MAN 300 exceeds a traffic load threshold or the expected quality of service for the RAB at the MAN 300 drops below a signal quality threshold.

In yet another embodiment, the gateway 100 receives a second flow control message 902b associated with the RAB from the SAN 500. The second flow control message 902b comprises at least one of: an indication of traffic load at the SAN 500, an indication of interference level for the RAB, an indication of radio resources available at the SAN 500, an indication of expected packet delivery rate for the RAB, an indication of the buffer status associated to the RAB, and an indication of expected quality of service or quality of experience for the RAB. Based on the second flow control message 902b the gateway 100 determines the first distribution D1. The first distribution D1 can be determined based on the relative comparison of the radio channel conditions of the user device 700 RAB perceived at the MAN 300 and a SAN 500, respectively. The gateway 100, for instance, could forward a larger fraction of the sequence of data packets S1 to the access node with the best channel condition towards the user device 700, as reported in the RRC measurement report 910, or with the most radio resource available for the user device 700. In alternative, the gateway 100 can realize several other traffic management policies. In one example, the gateway 100 can determine the first distribution D1 based on the relative comparison of traffic load at the MAN 300 and the SAN 500, respectively. For instance, it could reduce the fraction of data packets forwarded to the MAN 300 or to the SAN 500 when the traffic load at the MAN 300 exceeds a traffic load threshold.

The gateway 100 may, therefore, in one embodiment, transmit a control message 930 comprising the first distribution D1 to the MAN 300. In a LTE system, for instance, the control message 930 can be transmitted via the tunneling protocol for control information GTP-C. When the MAN 300 has a connection to the SAN 500, signalling the first distribution D1 to the MAN 300 according to the present embodiment enables the MAN to determine whether a portion of the sub-sequence of data packets S11 should be further forwarded to the SAN 500 to improve the performance of the user device 700.

From the MAN 300 perspective, the MAN 300 is configured to receive a RRC measurement report 910 from the user device 700. The RRC measurement report 901 is associated to the MAN 300 or at least one SAN 500. The MAN 300 determines, based on the received RRC measurement report 910, at least one of: an indication of traffic load at the MAN 300 associated with the RAB, an indication of interference level for the RAB, an indication of radio resources available at the MAN 300 for the RAB, an indication of expected packet delivery rate for the RAB, an indication of the buffer status associated to the RAB, and an indication of expected quality of service or quality of experience for the RAB.

Hence, the MAN 300 is configured to transmit a first flow control message 902a to the gateway 100 as described previously. The first flow control message 902a comprising the RRC measurement report 910 and at least one of: an indication of traffic load at the master access node 300 associated with the RAB, an indication of interference level for the RAB, an indication of radio resources available at the MAN 300 for the RAB, an indication of expected packet delivery rate for the RAB, an indication of the buffer status associated to the RAB, and an indication of expected quality of service or quality of experience for the RAB.

In yet another embodiment, the MAN 300 is further connected to the SAN 500 via a communication interface (such as X2 interface) configured to receive second flow control message 902b from the SAN 500. The second flow control message 902b comprises at least one of: an indication of traffic load at the SAN 500, an indication of interference level for the RAB, an indication of radio resources available at the SAN 500, an indication of expected packet delivery rate for the RAB, an indication of the buffer status associated to the RAB, and an indication of expected quality of service or quality of experience for the RAB. The MAN 300 encapsulates into the first flow control message 902a, for transmission to the gateway 100, at least one of; an indication of traffic load at the SAN 500, an indication of interference level for the RAB, an indication of radio resources available at the SAN 500, an indication of expected packet delivery rate for the RAB, an indication of the buffer status associated to the RAB, and an indication of expected quality of service or quality of experience for the RAB.

According to this embodiment, the MAN 300 can determine a second distribution D2 of the sequence of data packets S11 received from the gateway 100, e.g. in an LTE system, the sequence of data packets S11 can be received over the S1-interface. Thereby, the second distribution D2 may represent a split of the sequence of data packets S11 wherein a fraction of the received packets is routed to the SAN 500 while the remaining packets are transmitted wirelessly to the user device 700. The splitting decision, i.e. the second distribution D2, at the MAN 300 is e.g. based on SAN-related flow control messages reported either by the user device 700 or by the SAN 500 itself.

Accordingly, the MAN 300 is configured to determine a second distribution D2 of the first sub-sequence of data packets S11 split into a third sub-sequence of data packets S13 and at least a fourth sub-sequence of data packets S14 based on at least one of the RRC measurement report 910 and second flow control message 902b. Further, the MAN 300 is configured to forward the third sub-sequence of data packets S13 to the user device 700, and to forward the fourth sub-sequence of data packets S14 to the SAN 500.

In an embodiment, the first flow control message 902a comprises a second distribution D2 of the first sub-sequence of data packets split into a third sub-sequence of data packets and at least a fourth sub-sequence of data packets. The first flow control message 902a may further indicate that the fourth sub-sequence is addressed for the secondary access node.

Moreover, the MAN 300 may further be configured to receive a control message 930 from the gateway 100. The control message 930 indicates a first distribution D1 of the sequence of data packets S1 split into the first sub-sequence of data packets S11 and at least a second sub-sequence of data packets S12. Further, the MAN 300 is configured to determine the second distribution D2 based on at least one of the RRC measurement report 910, second flow control message 902b and the received control message 930. By further receiving a control message 930 indicating the first distribution D1 of the sequence of data packets S1, the MAN 300 is informed of the size of sub-sequence S12 of the data sequence S1 of the same RAB forwarded by the gateway 100 to the SAN 500. This enables the MAN 300 to determine and optimize the fourth sub-sequence of data packets S14 of the RAB to be forwarded to the SAN based also on the amount of data packets of the same RAB already forwarded by the gateway 100 to the SAN 500.

As understood, the second distribution D2 may comprise a split of the first sub-sequence of data packets S11 into the third sub-sequence of data packets S13 and the fourth sub-sequence of data packets S14.

In yet another embodiment, the first flow control message 902a which is transmitted to the gateway 100 may further comprise an indication of the second distribution D2. Upon receiving an indication of the second distribution D2, the gateway 100 can further optimize the determination of the first distribution D1 of the received sequence of data packets S1 split into a first sub-sequence of data packets S11 and at least a second sub-sequence of data packets S12 by taking into account that the MAN 300 can further distribute and forward part of the first sub-sequence of data packets S11 to the SAN 500.

With reference to the embodiments and use cases illustrated in FIGS. 5 to 8 further embodiments of the invention are hereby described. In this respect 3GPP system context and terminology is sometimes herein used. Hence, the gateway 100 corresponds to S-GW, the MAN 300 to a MeNB, and the SAN 500 to a SeNB in this particular context. However, embodiments of the invention are not limited thereof.

As aforementioned embodiments of the invention introduce packet-level RAB splitting at the gateway 100 in a wireless communication system 800, wherein user devices are concurrently served by at least two non co-located nodes, i.e. a MAN 300 and a SAN 500. The packet-level RAB splitting at the gateway 100, i.e. the first distribution D1, is determined by either the gateway 100 or the MAN 300 according to embodiments of the invention based on flow control messages reported by the MAN 300 and/or SAN 500 and comprises both user device 700 specific information and information specific to the MAN 300 and/or SAN 500. In an LTE system, packet routing from the gateway 100 towards the MAN 300 and SAN 500 takes place over the respective S1-interfaces used for interconnecting the gateway 100 with the MAN 300 and the SAN 500, respectively.

A user device 700 is considered having a RAB comprising a flow of packets arriving at the gateway 100 from an external IP network, e.g. Internet via the core network 802. The user device 700 is wirelessly connected with a MAN 300 and at least a SAN 500. The MAN 300 provides an anchor for control plane via a radio RRC link using a first radio operating on a first radio frequency and eventually a data plane connection using the same or another frequency. Instead, the SAN 500 provides a data plane connection to the user device 700 using a second radio operating on a second radio frequency in licensed spectrum and possibly on a third radio frequency in a licensed or unlicensed frequency spectrum, e.g., WLAN channel or Licensed Assisted Access (LAA).

Furthermore, the user device RRC measurements reports associated to the MAN 300 and SAN 500 may be reported to the MAN 300 via RRC signalling. Each RRC measurement report may comprise signal strength and channel quality indicators associated to MAN 300 and SAN 500, to a set of time-frequency resources (such as a frequency carrier or a time-frequency resource block), and can additionally be associated with a specific radio access technology, e.g., LTE in licensed spectrum, LTE in unlicensed spectrum, WLAN, etc.

As seen in FIG. 5 the gateway 100 is configured to determine packet-level RAB splitting, i.e. the first distribution D1, of the user device RAB into a first sequence of data packets S11 and a second sequence of data packets S12. In FIG. 5 the first distribution D1 is determined and executed in the gateway 100.

The first sequence of data packets S11 is forwarded/routed to the MAN 300 and the second sequence of data packets S12 is forwarded/routed to the SAN 500. This is essentially different from conventional solutions wherein only a RAB-level RAB splitting configuration is supported meaning that all data packets belonging to same RAB can be either routed towards the MAN 300 or the SAN 500, depending on the splitting decision (on a RAB granularity) at the gateway 100.

The gateway 100 determines the data packet-level RAB splitting ratio, i.e. the first distribution D1, based on flow control messages 902a, 902b, . . . , 902n associated with the RAB that it receives from the MAN 300 and the SAN 500.

Based on the received RRC measurement reports, traffic load and expected QoS/QoE per access node, the gateway 100 can determine an efficient packet-level split of the RAB depending on configured optimization strategy running at the gateway 100. For instance, the splitting distribution D1 could aim at maximizing the throughput at the MAN 300 or at the SAN 500, minimizing the data plane latency or even balancing the load between the MAN 300 and the SAN 500.

As previously explained, in some cases a X2 interface is present between the MAN 300 and SAN 500 as illustrated in FIG. 6. In this case, the SAN 500 can be further configured to transmit a flow control message 902b to the MAN 300 (but also to the gateway 100). Based on the received flow control information in the flow control message 902b, the MAN 300 can determine a second packet-level RAB split, i.e. the second distribution D2, of the first sub-sequence of data packets S11 received from the gateway 100 into a third sub-sequence of data packets S13 and at least a fourth sub-sequence of data packets S14. Further, the MAN 300 is configured to forward the third sub-sequence of data packets S13 to the user device 700, and to forward the fourth sub-sequence of data packets S14 to the SAN 500. In FIG. 6 the first distribution D1 is determined and executed in the gateway 100 and the second distribution D2 is determined and executed in the MAN 300.

Therefore, the first flow control message 902a in this embodiment may further comprise a second distribution D2 of the first sub-sequence of data packets S11 split into a third sub-sequence of data packets S13 and at least a fourth sub-sequence of data packets S14, and further indicating that the fourth sub-sequence is addressed for the SAN 500.

The periodicity of the flow control messages sent from the SAN 500 to the MAN 300 and gateway 100 could be signalled from the MAN 300 upon the establishment of the data plane radio link between the SAN 500 and the user device 700. Nevertheless, since the MAN 300 can adapt faster than the gateway 100 to the variant radio network conditions, the splitting decision at the MAN 300 should operate at a shorter time scale as compared to the gateway 100 splitting decision. In such a manner, the splitting decision at the MAN 300 could aim at maximizing the user throughput by e.g. exploiting variations in the traffic load of the access nodes, whilst the splitting decision at the gateway 100 could operate at a slower rate aiming at minimizing the data plane latency. Essentially, the benefit of this solution is that it reduces the portion of traffic forwarded over the X2 interface resulting in reduced data plane latency compared to the conventional 3C split-bearer architecture, wherein all data packets destined to the SAN 500 have to be routed via the MeNB.

In another embodiment of the invention as illustrated in FIG. 7, the SAN 500 is configured (e.g. via the MAN 300) to report flow control messages solely to the MAN 300. In this example, the SAN 500 flow control message 902b received by the MAN 300 are encapsulated within the flow control message 902a that the MAN 300 transmits to the gateway 100. The benefit of this solution is that it reduces the control plane signalling triggered by the SAN 500 flow control messages (as they are no longer are sent to the gateway 100) without compromising the packet-level RAB splitting decision taken at the gateway 100. In FIG. 7 the first distribution D1 is determined and executed in the gateway 100 and the second distribution D2 is determined and executed in the MAN 300.

Figure 8:
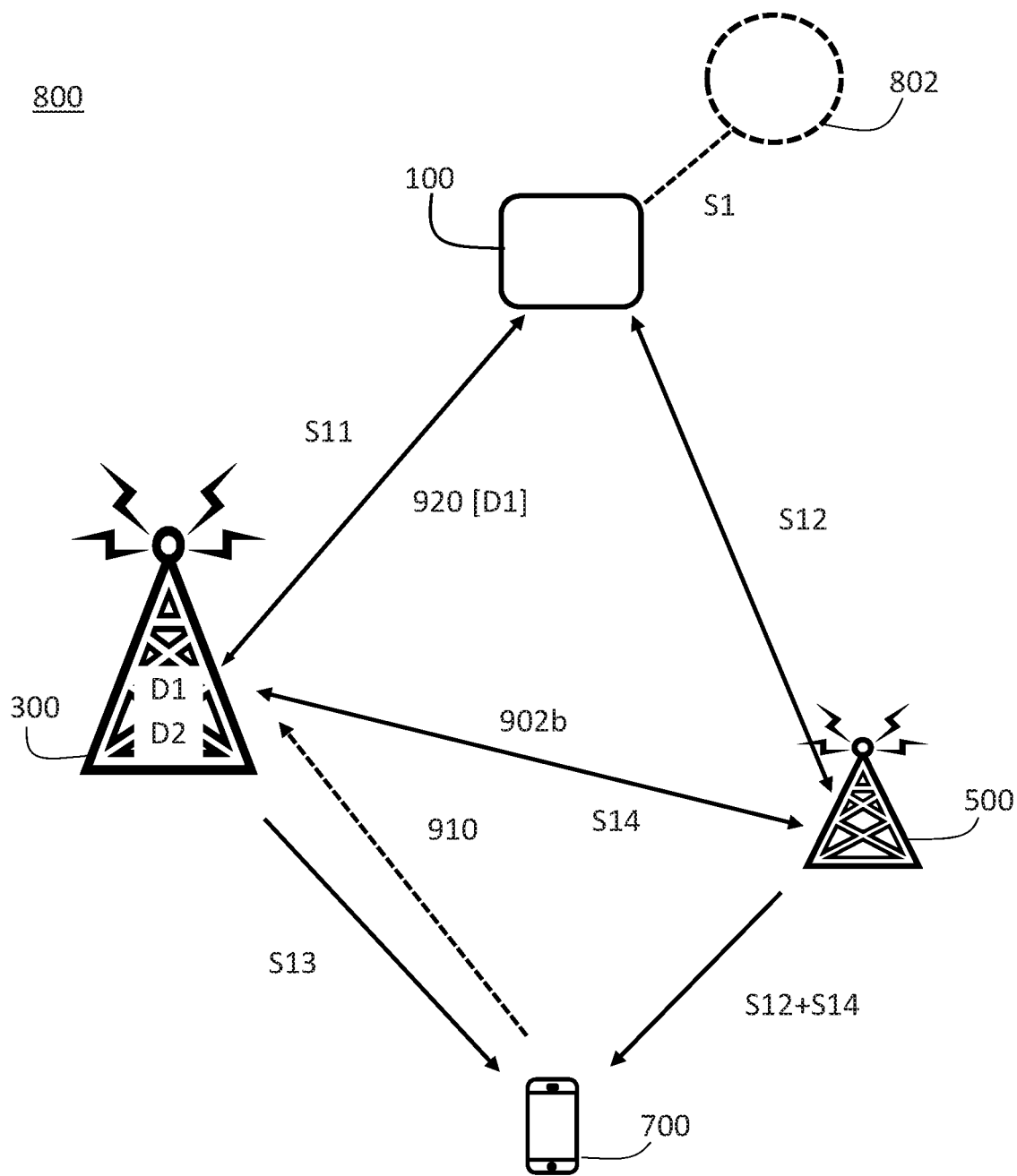

A further embodiment of the invention is illustrated in FIG. 8. According to this embodiment the MAN 300 is configured to determine not only the second RAB splitting ratio, i.e. the first distribution D2, but also the first RAB splitting ratio, i.e. the first distribution D1, performed at the gateway 100. In FIG. 8 both the first D1 and the second D2 distributions are determined by the MAN 300. However, only the second distribution D2 is executed in the MAN 300 while the first distribution D1 is executed in the gateway 100 which receives the first distribution D1 via suitable signalling as described previously.

The first distribution D1 may be based on the flow control messages received from the SAN 500. Thereby, the MAN 300 decision may be forwarded to the gateway 100 which thereafter applies it as dictated by the MAN 300. The fundamental difference of this solution is that the MAN 300 has full control of the packet-level RAB splitting decisions taken not only at itself but also at the gateway 100.

Accordingly, according to this embodiment the MAN 300 is configured to determine the first distribution D1 of the sequence of data packets S1 split into the first sub-sequence of data packets S11 and at least a second sub-sequence of data packets S12 based on at least one of the RRC measurement report 910 and a second flow control message 902b. The first sub-sequence of data packets S11 is addressed for the MAN 300 itself and the second sub-sequence of data packets S12 is addressed for the SAN 500. In this case, the MAN 300 transmits a distribute packet command 920 indicating the first distribution D1 to the gateway 100. Thereby, the gateway 100 obtains the first distribution D1 of the received sequence of data packets S1 and, according to previous embodiments, forwards the first sub-sequence of data packets S11 of the RAB to the MAN 300 and at least a second sub-sequence of data packets S12 of the RAB to the SAN 500.

Correspondingly, the gateway 100 is configured to receive the distribute packet command 920 indicating the first distribution D1. Hence, the gateway 100 obtains the first distribution D1 based on the received distribute packet command 920 and forwards data packets according to the first distribution D1.

In an example of this embodiment, the MAN 300 determines the first distribution D1 further based on the RRC measurement report and at least one in the group of: the traffic load at the master access node 300, an indication of interference level for the RAB, an indication of radio resources available at the MAN 300, an indication of expected packet delivery rate for the RAB at the MAN 300, an indication of the buffer status associated to the RAB at the MAN 300.

In yet another example, the MAN 300 determines the first distribution D1 further based on the traffic load at the MAN 300 or at the SAN 500, an indication of interference level for the RAB, an indication of radio resources available at the MAN 300 or at the SAN 500, an indication of expected packet delivery rate for the RAB at the MAN 300 or at the SAN 500, an indication of the buffer status associated to the RAB at the MAN 300 or at the SAN 500.

Furthermore, any methods according to embodiments of the invention may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the gateway 100 and MAN 300 comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

What is claimed is:

1. A gateway for a communication system, the gateway comprising:
   a transceiver configured to
   receive a sequence of data packets on a Radio Access Bearer, RAB, from a core network,
   receive a first flow control message associated with the RAB from a master access node,
   receive a second flow control message associated with the RAB from a secondary access node, and
   a processor configured to
   split a first distribution of the received sequence of data packets into a first sub-sequence of data packets and at least a second sub-sequence of data packets, wherein the first distribution is determined by the processor based on the received first flow control message and the received second flow control message,
   wherein the transceiver is configured to
   forward the first sub-sequence of data packets on the RAB to the master access node, and
   forward the second sub-sequence of data packets on the RAB to the secondary access node.

2. The gateway according to claim 1, wherein
   the first flow control message comprises a Radio Resource Control, RRC, measurement report associated with the RAB and at least one of: an indication of a traffic load at the master access node, an indication of an interference level for the RAB, an indication of radio resources available at the master access node, an indication of an expected packet delivery rate for the RAB, an indication of a buffer status associated with the RAB, and an indication of an expected quality of service or quality of experience for the RAB.

3. The gateway according to claim 1 wherein the first flow control message comprises a second distribution of the first sub-sequence of data packets split into a third sub-sequence of data packets and at least a fourth sub-sequence of data packets, and further indicating that the fourth sub-sequence is addressed for the secondary access node.

4. The gateway according to claim 1,
   wherein the second flow control message comprises at least one of: an indication of a traffic load at the secondary access node, an indication of an interference level for the RAB, an indication of radio resources available at the secondary access node, an indication of an expected packet delivery rate for the RAB, an indication of a buffer status associated with the RAB, and an indication of an expected quality of service or quality of experience for the RAB.

5. The gateway according to claim 2, wherein the transceiver is configured to
   transmit a control message comprising the first distribution to the master access node.

6. The gateway according to claim 1, wherein the transceiver is configured to
   receive a distribute packet command indicating the first distribution from the master access node;
   wherein the processor is configured to
   split the first distribution based on the received distribute packet command.

7. The gateway according to claim 1, wherein the first distribution comprises a split of the received sequence of data packets into the first sub-sequence of data packets and the second sub-sequence of data packets.

8. A master access node for a communication system, the master access node comprising:
   a processor, and
   a transceiver configured to
   receive a first sub-sequence of data packets of a sequence of data packets carried by a Radio Access Bearer, RAB, from a gateway, wherein the RAB is associated with a user device,
   receive a Radio Resource Control, RRC, measurement report from the user device, the RRC measurement report being associated with the master access node or a secondary access node, and receive a second flow control message from the secondary access node, wherein the processor is configured to encapsulate the second flow control message into a first flow control message, and wherein the transceiver is further configured to:

transmit the first flow control message to the gateway, and forward at least one part of the first sub-sequence of data packets on the RAB to the user device.

9. The master access node according to claim 8, wherein the processor is configured to determine at least one of: an indication of a traffic load at the master access node associated with the RAB, an indication of an interference level for the RAB, an indication of radio resources available at the master access node for the RAB, an indication of an expected packet delivery rate for the RAB, an indication of a buffer status associated with the RAB, and an indication of an expected quality of service or quality of experience for the RAB based on the received RRC measurement report.

10. The master access node according to claim 8, wherein the first flow control message comprises the RRC measurement report and at least one of: the indication of the traffic load at the master access node associated with the RAB, the indication of the interference level for the RAB, the indication of radio resources available at the master access node for the RAB, the indication of the expected packet delivery rate for the RAB, the indication of the buffer status associated with the RAB, and the indication of the expected quality of service or quality of experience for the RAB.

11. The master access node according to claim 8, wherein the second flow control message comprises at least one of:

an indication of a traffic load at the secondary access node, an indication of an interference level for the RAB, an indication of radio resources available at the secondary access node, an indication of an expected packet delivery rate for the RAB, an indication of a buffer status associated with the RAB, and an indication of an expected quality of service or quality of experience for the RAB.

12. The master access node according to claim 9, wherein the processor is configured to determine a first distribution of the sequence of data packets into the first sub-sequence of data packets and at least a second sub-sequence of data packets based on at least one of the RRC measurement report and the second flow control message, wherein the first sub-sequence of data packets is addressed for the master access node and the second sub-sequence of data packets is addressed for the secondary access node, wherein the transceiver is configured to transmit a distribute packet command indicating the first distribution to the gateway.

13. The master access node according to claim 9, wherein the processor is configured to determine the first distribution further based on the RRC measurement report and at least one in the group of: the traffic load at the master access node, the indication of the interference level for the RAB, the indication of radio resources available at the master access node, the indication of the expected packet delivery rate for the RAB at the master access node, and the indication of the buffer status associated with the RAB at the master access node, wherein the transceiver is configured to transmit a distribute packet command indicating the first distribution to the gateway.

14. The master access node according to claim 12, wherein the processor is configured to determine the first distribution further based on the traffic load at the master access node or at the secondary access node, the indication of the interference level for the RAB, the indication of radio resources available at the master access node or at the secondary access node, the indication of the expected packet delivery rate for the RAB at the master access node or at the secondary access node, or the indication of the buffer status associated with the RAB at the master access node or at the secondary access node.

15. The master access node according to claim 9, wherein the processor is configured to split a second distribution of the first sub-sequence of data packets into a third sub-sequence of data packets and at least a fourth sub-sequence of data packets based on at least one of the RRC measurement report and the second flow control message, wherein the transceiver is configured to forward the third sub-sequence of data packets to the user device, and forward the fourth sub-sequence of data packets to the secondary access node.

16. The master access node according to claim 15, wherein the transceiver is configured to receive a control message from the gateway, the control message indicating a first distribution of the sequence of data packets split into the first sub-sequence of data packets and at least a second sub-sequence of data packets, wherein the processor is configured to determine the second distribution based on at least one of the RRC measurement report, the second flow control message and the received control message.

17. The master access node according to claim 15, wherein the second distribution comprises a split of the first sub-sequence of data packets into the third sub-sequence of data packets and the fourth sub-sequence of data packets.

18. The master access node according to claim 15, wherein the first flow control message further comprises an indication of the second distribution.

19. A method performed by a gateway, the method comprising:

receiving a sequence of data packets on a Radio Access Bearer, RAB, from a core network, receiving a first flow control message associated with the RAB from a master access node, receiving a second flow control message associated with the RAB from a secondary access node, splitting a first distribution of the received sequence of data packets into a first sub-sequence of data packets and at least a second sub-sequence of data packets, wherein the first distribution is determined by the processor based on the received first flow control message and the received second flow control message, forwarding the first sub-sequence of data packets on the RAB to the master access node, and forwarding the second sub-sequence of data packets on the RAB to the secondary access node.

20. A method performed by a master access node, the method comprising:

receiving a first sub-sequence of data packets of a sequence of data packets carried by a Radio Access Bearer, RAB, from a gateway, wherein the RAB is associated with a user device, receiving a Radio Resource Control, RRC, measurement report from the user device, the RRC measurement report being associated with a master access node or a secondary access node, receiving a second flow control message from the secondary access node, encapsulating the second flow control message into a first flow control message, transmitting the first flow control message to the gateway, and forwarding at least one part of the first sub-sequence of data packets on the RAB to the user device.

21. A non-transitory computer readable medium comprising a program code for performing, when the computer program runs on a computer, a method comprising:

receiving a sequence of data packets on a Radio Access Bearer, RAB, from a core network, receiving a first flow control message associated with the RAB from a master access node, receiving a second flow control message associated with the RAB from a secondary access node, splitting a first distribution of the received sequence of data packets into a first sub-sequence of data packets and at least a second sub-sequence of data packets, wherein the first distribution is determined by the processor based on the received first flow control message and the received second flow control message, forwarding the first sub-sequence of data packets on the RAB to the master access node, and forwarding the second sub-sequence of data packets on the RAB to the secondary access node.

22. A non-transitory computer readable medium comprising a program code for performing, when the computer program runs on a computer, a method comprising:

receiving a first sub-sequence of data packets of a sequence of data packets carried by a Radio Access Bearer, RAB, from a gateway, wherein the RAB is associated with a user device, receiving a Radio Resource Control, RRC, measurement report from the user device, the RRC measurement report being associated with a master access node or a secondary access node, receiving a second flow control message from the secondary access node, encapsulating the second flow control message into a first flow control message, transmitting the first flow control message to the gateway, and forwarding at least one part of the first sub-sequence of data packets on the RAB to the user device.

* * * * *